March 25, 1930.  J. A. WEIGER  1,751,780

BEARING MATERIAL FOR CURRENT TRAVERSED BEARINGS

Filed July 9, 1927

W-Cu

INVENTOR.
Joseph A. Weiger
BY
Mayer, Warfield & Watson ATTORNEYS.

Patented Mar. 25, 1930

1,751,780

UNITED STATES PATENT OFFICE

JOSEPH A. WEIGER, OF UNION CITY, NEW JERSEY, ASSIGNOR, BY MESNE ASSIGNMENTS, TO P. R. MALLORY & CO., INCORPORATED, OF INDIANAPOLIS, INDIANA, A CORPORATION OF INDIANA

BEARING MATERIAL FOR CURRENT-TRAVERSED BEARINGS

Application filed July 9, 1927. Serial No. 204,476.

This invention relates to materials adapted for use in bearings traversed by electric currents. More particularly it relates to bearing materials for the bearings of trolley wheels, electric motors, electric resistance heat welders, and the like.

The invention has for its object generally an improved construction for bearing sleeves and bushings in order that the same may be durable and efficient.

A specific object of the invention is to provide a bearing material which may be used in bushings and sleeves for bearings which is mechanically durable and not liable to pit or otherwise be disintegrated by the current passing.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

Figure 1:
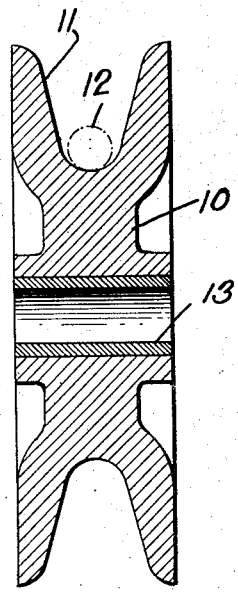
Figure 2:
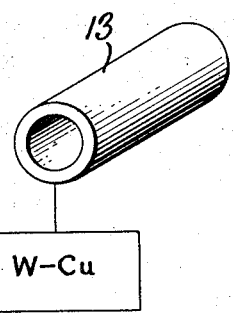
Figure 3:
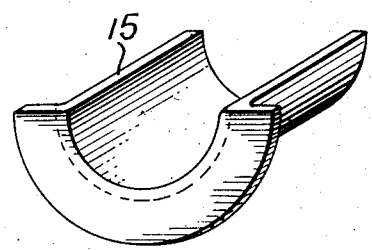
Figure 4:
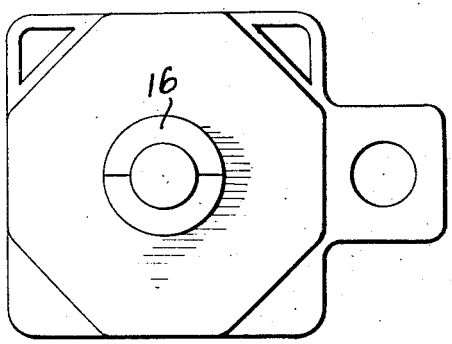

For a fuller understanding of the nature and objects of the invention reference should be had to the following detailed description taken in connection with the accompanying drawing, in which: Fig. 1 is a sectional view of a trolley wheel bushed with a sleeve of improved bearing material in accordance with the present invention; Fig. 2 is a perspective view of the bushing diagrammatically indicating its composition; Fig. 3 is a perspective view illustrating the form of a half-sleeve bushing employed in electric motors; and Fig. 4 is an elevational view illustrating a railway motor of the type in which the bushing shown in Fig. 3 is used.

Referring now to the drawing and particularly to Fig. 1, 10 denotes a trolley wheel having a circumferential groove at 11 in which the trolley conductor 12 is adapted to engage for collecting current. This wheel may be of any suitable conducting material, for example, copper, brass or bronze. In the central bore of the trolley wheel a bushing 13 is inserted, which bushing is adapted to be journalled upon a cross-rod in the harp of a trolley pole. This bushing is preferably of such size as to be tightly secured in the central bore of the trolley wheel and is not readily displaced. Such bushing is usually inserted in and displaced from the central bore by means of a hydraulic press.

Heretofore the bushing of a trolley wheel has been selected for the purpose of its mechanical durability. In accordance with the present invention, the sleeve is not only selected because of mechanical durability but also that it may impart improved electrical characteristics. The bushing material herein employed is a composite metal which has great mechanical rigidity, is able to withstand severe mechanical strains, has high electrical and thermal conductivities and is also resistant to pitting and other disintegrating influences incident to the passage of the current from the trolley wheel to the journal secured in the harp of the trolley pole.

The composite metal of which the bushing is formed has a body of tungsten which is impregnated with copper or with copper having some hardening material in combination. The tungsten for the composite metal is taken in substantially from 40 to 80 parts by weight to from 60 to 20 parts by weight of the cuprous material employed. Where hardening material enters in the composition, it is not over 2 percent of the whole and is generally less than one percent. Where used it will be understood as included in the cuprous material.

Tungsten, which is one of the most refractory of metals, imparts to the composite metal the durability and resistance to mechanical strains desired in connection with the bushing to be traversed with current. The impregnating metal decreases the resistance inherent in a pure tungsten body and imparts to it relatively high electrical and thermal conductivities.

It has been ascertained that the co-efficient of friction between the surface of a composite metallic body as herein provided and that of an engaging surface such as that of the journal secured in the harp of the trolley pole is relatively small. In consequence, the engaging surfaces require little lubrication and can run for relatively long periods without any lubrication. The impregnation of the tungsten body by a metal such as copper thus furnishes a bearing material exhibiting a lubricating effect.

It is thus seen that a bearing traversed by electric current provided in accordance with the present invention has not only mechanical and electrical durability and is resistant to pitting so that it is not deleteriously deformed by the passage of the current but is also self-lubricating in large measure and requires little attention on the part of attendants oiling such bearings of electrical machines. The passage of current through the bearing in consequence is relatively uniform and since the resistance at the bearing surface is not subject to change on account of pitting or lubrication, the power had in consequence from an electric machine traversed by current connected in series with the bearing provided herein is in consequence more uniform and not subject to the voltage fluctuations incident to arcing and sparking at the bearing surfaces.

The performance of electric motors which have bearings traversed by electric current is also improved when the bearing sleeves are constructed in accordance with the present invention.

In Fig. 3 is shown an ordinary half-sleeve bushing 15 suitable for use in the main bearings 16 of the railway type motor shown in Fig. 4, the reduction gearing being omitted from this figure in the interests of clearness. In this arrangement the motor characteristics are improved in substantially the same manner as indicated above; the bearings having both mechanical and electrical durability are devoid of pitting, and require little attention in the matter of lubrication, though it is preferable to provide railway motors in this service with the usual bearing housings of the oil-well type. In consequence thereof the motor torque is more uniform and not liable to fluctuations due to resistance at the bearing surfaces. In such combinations, the current traversing the motor bearing as a rule passes to ground, since it is the usual practice in railway service to employ the rails as the return conductors for the current after it has traversed the motor lining.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent of the United States is:

1. A bearing for devices adapted to be traversed by electrical currents without pitting; comprising a sleeve member adapted to fit over a journal member through which an electric current may pass; said sleeve member having a body of metallic tungsten impregnated with a relatively light, low melting-point metal and a relatively small amount of a hardening agent whereby to impart hardness and self-lubricating characteristic to the sleeve member, the tungsten being taken in an amount not greater than eight parts by weight for a whole of ten parts.

2. A bearing for devices adapted to be traversed by electrical currents without pitting; comprising a sleeve member adapted to fit over a journal member through which an electric current may pass; said sleeve member having a body of metallic tungsten impregnated with metallic copper and having a hardening agent dispersed therein, the tungsten and copper being taken in substantially the ratio of from 4 to 8 parts by weight of tungsten to from 6 to 2 parts by weight of copper, the hardening agent being taken in an amount not substantially greater than two percent by weight of the whole.

In testimony whereof I affix my signature.

JOSEPH A. WEIGER.